US012361678B2

(12) United States Patent
Goodsitt et al.

(10) Patent No.: US 12,361,678 B2
(45) Date of Patent: Jul. 15, 2025

(54) SYSTEMS AND METHODS FOR AUTHENTICATING VIA PHOTO MODIFICATION IDENTIFICATION

(71) Applicant: Capital One Services, LLC, McLean, VA (US)

(72) Inventors: Jeremy Goodsitt, Champaign, IL (US); Galen Rafferty, Mahomet, IL (US); Grant Eden, San Francisco, CA (US); Anh Truong, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 514 days.

(21) Appl. No.: 17/821,987

(22) Filed: Aug. 24, 2022

(65) Prior Publication Data

US 2024/0071045 A1    Feb. 29, 2024

(51) Int. Cl.
*G06V 10/764* (2022.01)
*G06T 11/00* (2006.01)
*H04L 9/32* (2006.01)

(52) U.S. Cl.
CPC .......... *G06V 10/764* (2022.01); *G06T 11/006* (2013.01); *H04L 9/32* (2013.01)

(58) Field of Classification Search
CPC ...... G06N 3/094; G06N 3/0475; G06T 19/00; G06V 10/82; H04L 41/16; H04L 9/32; G06F 21/31; G06F 21/44; G06F 21/45; G06F 21/30
See application file for complete search history.

(56) References Cited

U.S. PATENT DOCUMENTS

2022/0191195 A1*  6/2022  Moros Ortiz ....... H04L 63/0861
2022/0292171 A1*  9/2022  Taher ...................... G06N 3/08

\* cited by examiner

*Primary Examiner* — Raphael Schwartz
(74) *Attorney, Agent, or Firm* — Foley & Lardner LLP

(57) ABSTRACT

Methods and systems described herein relate to authenticating users-based on generating images that have modified features. More specifically, the methods and systems generate these images by processing existing training data to identify a common feature in existing photos that may be modified, and then modifying that feature with the use of generative adversarial networks.

18 Claims, 5 Drawing Sheets

400

402
Determine a respective similarity value for each of the personal images

404
Select a personal image based on the personal image satisfying a similarity value threshold

406
Input the selected personal image into a generative adversarial network to generate a modified personal image

408
Generate in a user interface of a user device, the modified personal digital media item

410
Receive via the user interface of the user device, one or more user selections of speculative modified features

412
Determine whether the one or more user selections of the speculative modified features correspond to the modified personal digital media item

414
Authenticate the user based on the one or more user selections of the speculative modified features

*FIG. 4*

SYSTEMS AND METHODS FOR AUTHENTICATING VIA PHOTO MODIFICATION IDENTIFICATION

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review, as the process by which the results are made may be unknown or obscured. This obscurity creates hurdles for identifying errors in the results, as well as improving the models providing the results. These technical problems present an inherent problem with attempting to use an artificial intelligence-based solution in authentication systems that lack high-quality training data.

SUMMARY

Methods and systems are described herein for novel uses and/or improvements to artificial intelligence applications. As one example, methods and systems are described herein for authentication users based on whether or not users can correctly select modified portions of the user's own images (e.g., selecting what is not correct in an image).

To authenticate users, existing systems rely on users selecting images (e.g., featuring bikes, cars, and/or other common features) for which there is a plethora of available training data (e.g., images labeled with these common features). However, such authentication systems are easily circumvented by nefarious users, as the nefarious users can easily guess the labels in this data. One solution to this problem would be to require users to select features that would only be known to the specific user. For example, the system could require a user to select an image of the user's best friend, pet, etc. However, this solution is easier to overcome by nefarious users, as some information (e.g., a user's friend, pet, etc.) may be easily detectable via online searches. In contrast, an authentication system may provide enhanced security by generating images based on actual images of the users and modifying certain portions of the images. Such an approach would not be easily circumvented by nefarious users, even if the nefarious users have access to online searching.

To generate the images with the modified portions, the system may use an artificial intelligence application. However, the difficulty in adapting artificial intelligence models for this practical benefit faces several technical challenges, such as lack of high-quality training data to train artificial intelligence to accurately create partially modified media or images.

To overcome these technical deficiencies in adapting artificial intelligence models for this practical benefit, methods and systems disclosed herein may generate high-quality training data by processing existing training data to determine a similarity metric of various media items in the training data. The system may then select a media item that is true and modify it. The system may allow users to select the media that they believe is modified and if above a threshold amount, the system may authenticate. For example, the existing systems have only ever authenticated users based on their knowledge of what is true. Previously, there was no training data available for artificial intelligence to authenticate users by utilizing a modified media item. Accordingly, the methods and systems provide a way to prevent nefarious users from circumventing the authentication system.

In some aspects, systems and methods for authenticating users-based modifications to media items of the users to reduce malicious user authentication are described. For example, the system may determine, based on a plurality of personal digital media items of a user, a respective similarity value for each personal digital media item of the plurality of personal digital media items, wherein the respective similarity value indicates a similarity of a respective personal digital media item to the plurality of personal digital media items, and wherein each personal digital media item comprises one or more unmodified personal digital media item features. The system may select a personal digital media item from the plurality of personal digital media items, based on a respective similarity value for the personal digital media item satisfying a similarity value threshold. The system may input the personal digital media item into a machine learning model to generate a modified personal digital media item, wherein the modified personal digital media item comprises one or more modified features corresponding to the one or more unmodified digital media item features of the personal digital media item. The system may generate for presentation, in a user interface of a user device, the modified personal digital media item. The system may receive via the user interface of the user device, one or more user selections of speculative modified features. The system may determine whether the one or more user selections of the speculative modified features correspond to the one or more modified features of the modified personal digital media item. The system may authenticate the user based on the one or more user selections of the speculative modified features corresponding to the one or more modified features of the modified personal digital media item.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in authenticating users-based modifications to media items of the users to reduce malicious user authentication, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
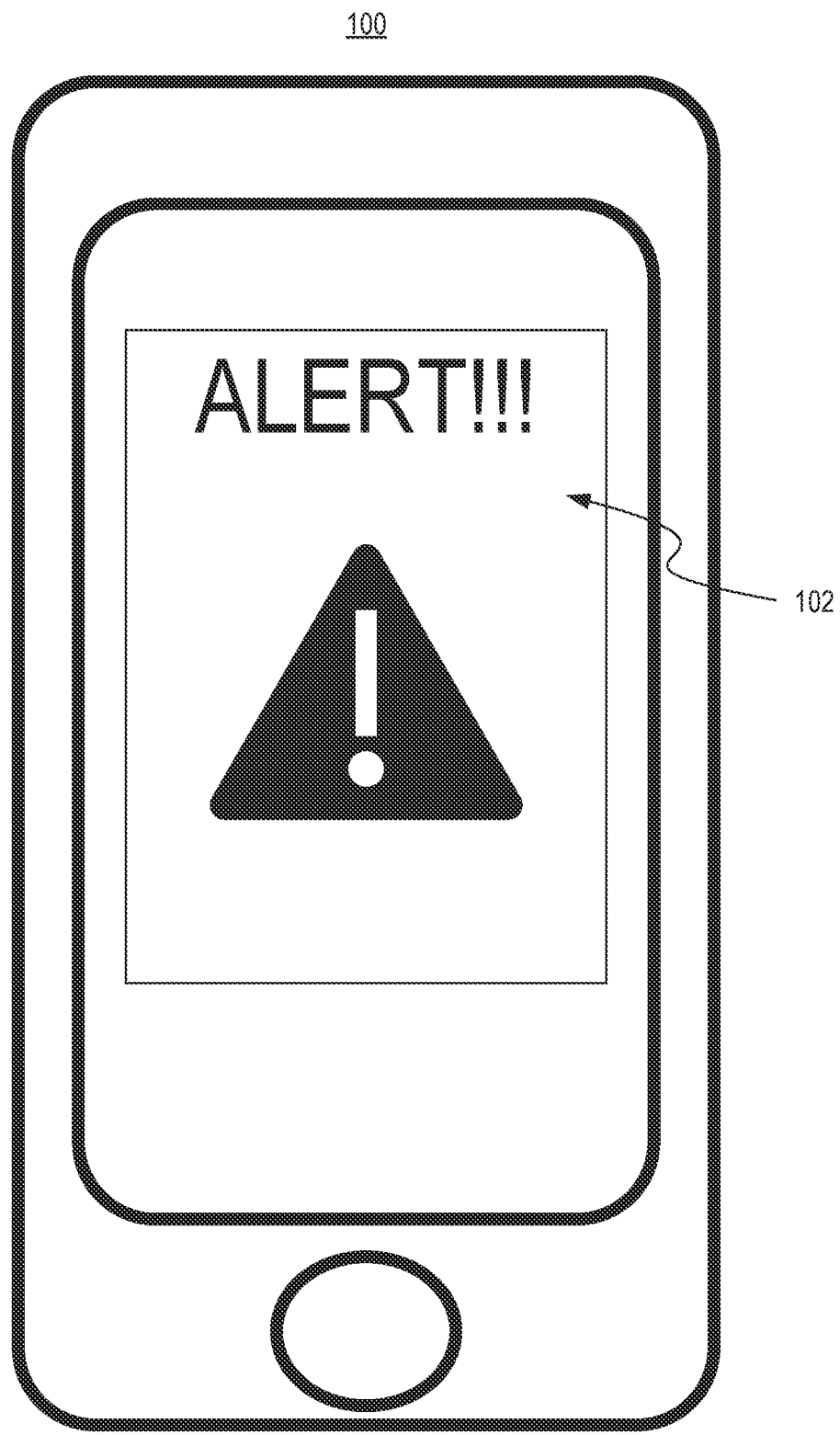
FIG. 1A-B shows an illustrative diagram for an authentication system that prevents circumvention by nefarious users, in accordance with one or more embodiments.
Figure 1B:
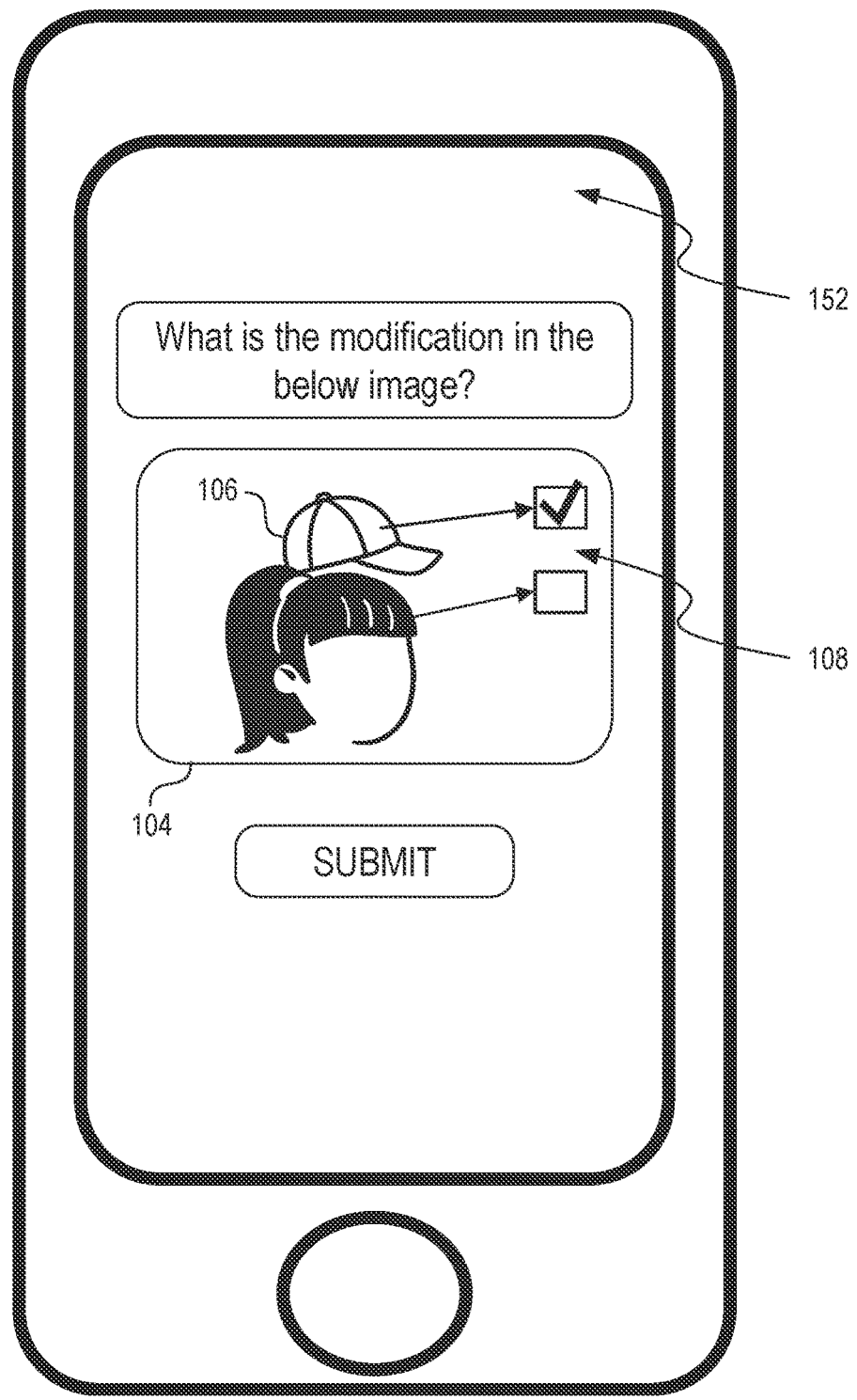

FIGS. 1A-B show illustrative user interfaces displaying a modified personal digital media item, in accordance with one or more embodiments. For example, FIG. 1A shows a user device and user interface (e.g., of a web browser) featuring an alert to the user about authenticating their account. For example, FIG. 1A shows user device 100, which is presenting user interface 102.

As referred to herein, a "user interface" may comprise a human-computer interaction and communication in a device, and may include display screens, keyboards, a mouse, and the appearance of a desktop. For example, a user interface may comprise a way a user interacts with an application or a website. User interface 102 may be used to authenticate a user.

For example, user interface 102 may access a user database, wherein the user database comprises a plurality of personal images of users and wherein each personal image of the plurality of personal images comprises one or more unmodified personal image features. In some embodiments, user interface 102 may access multiple types of content and use that content to authenticate a user.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

User interface 102 may determine, based on the plurality of personal images of a user, a respective similarity value for each of the personal images of the plurality of personal images, wherein the respective similarity value indicates a similarity of a respective personal image to the plurality of personal images to the user.

As referred to herein, a "respective similarity value" may include a numeric representation that indicates the number of shared characteristics between two or more objects. In some embodiments, the respective similarity value may comprise a numeric representation that indicates the number of shared characteristics between two media items. In some embodiments, the respective similarity value may comprise a numeric representation that indicates the number of shared characteristics between two sets of data.

As referred to herein, a "personal digital media item" may include personal images of the user, personal images that belong to the user, and other types of media similar to images that belong to the user. In some embodiments, the personal digital media item may comprise images or other visual media files of the user, wherein the image of the user may comprise of images of the user that do not belong to the user. In some embodiments, the personal digital media item may comprise an images or other visual media files that belong to the user, wherein images that belong to the user may include images of other people. For example, a personal digital media item may include an image of the user's family member.

The system may select a personal image of the plurality of personal images based on the personal image satisfying a similarity value threshold. As referred to herein, a "similarity value threshold" may include a range of numbers that limits the number of unshared and shared characteristics between two or more objects that can be changed depending on the importance metric of the data being accessed. In some embodiments, the similarity value threshold may comprise a range of numbers that limits how different two media items of the same person can be. In some embodiments, the similarity value threshold may comprise a range of numbers that must be satisfied for it to be chosen for a machine learning model that is determined by the data set that was given.

The system may input the selected personal image into a generative adversarial network (GAN) to generate a modified personal image, wherein the modified personal image comprises one or more modified features corresponding to the one or more unmodified personal image features of the personal image. For example, the system may generate a modified personal digital media item in which only one personal image feature has been modified.

The system may determine, based on the one or more modified features of the modified personal image, a modification value, wherein the modification value indicates a change of degree between the modified personal image and the personal image.

A user profile may be a directory of stored user settings, preferences, and information for the related user account. For example, a user profile may have the settings for the user's installed programs and operating system. In some embodiments, the user profile may be a visual display of personal data associated with a specific user, or a customized desktop environment. In some embodiments, the user profile may be digital representation of a person's identity.

FIG. 1A shows user interface 102. User interface 102 includes a plurality of personal digital media items. The system may generate for presentation, in user interface 102 of a user device 100, the modified personal digital media item.

FIG. 1B shows user interface 152. User interface 152 includes the plurality of personal digital media items. The system may generate for presentation, in user interface 152 of a user device 150, the modified personal digital media item 104. The system may receive, via the user interface 152 of the user device 150, a user selection 108 of speculative modified features 106. The system may determine whether the user selection 108 of the speculative modified features 106 correspond to the one or more modified features of the modified personal digital media item, and authenticate the user based on the one or more user selections of the speculative modified features corresponding to the one or more modified features of the modified personal digital media item.

The system may use a generative adversarial network. As referred to herein, a "generative adversarial network" may include a machine learning framework, wherein two neural networks compete against each other. In some embodiments, the generative adversarial network may comprise an artificial neural network that can be trained to create sets of realistic data. In some embodiments, the generative adversarial network may comprise a generative model that can learn in an unsupervised manner and can determine how realistic data is.

Figure 2:
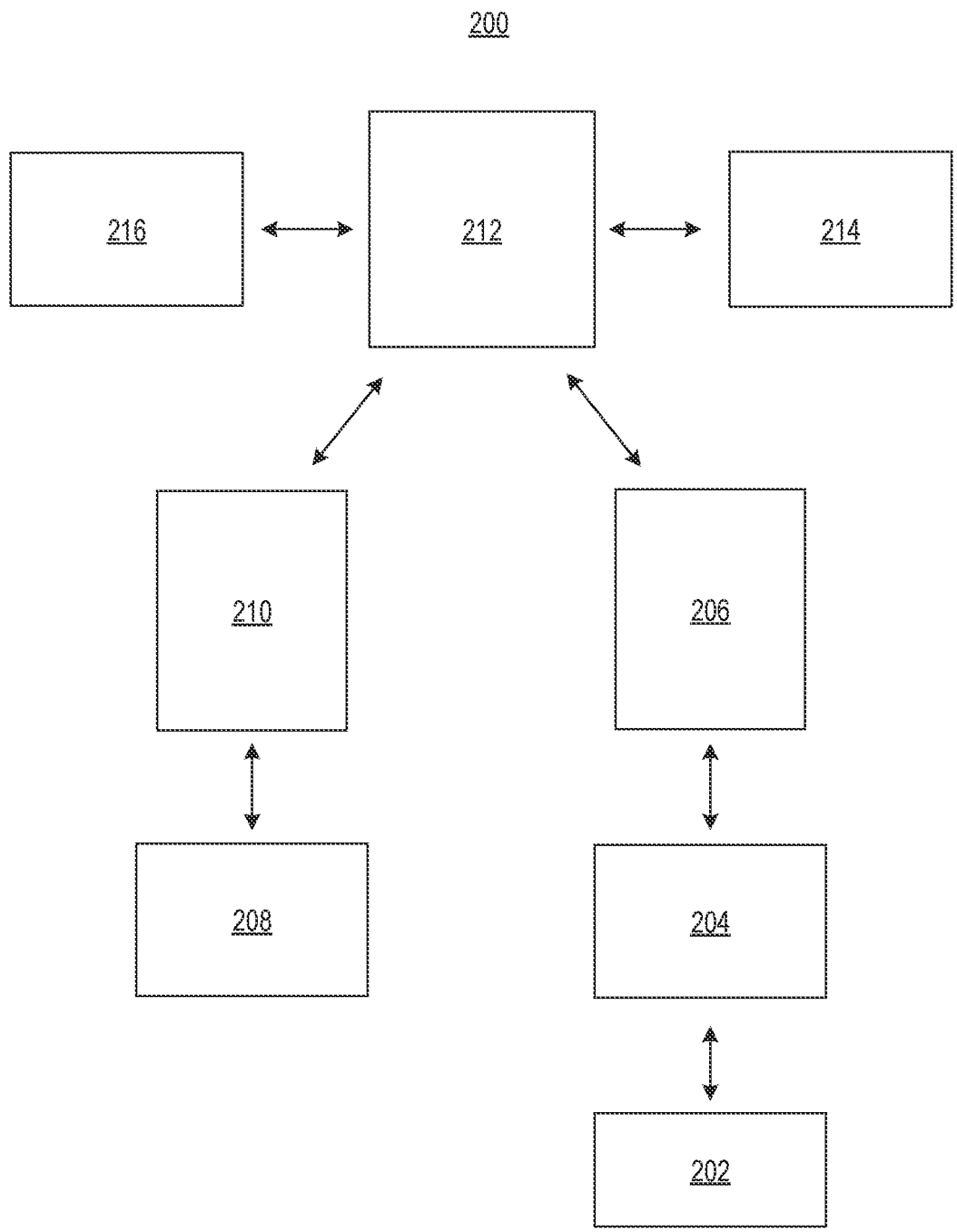
FIG. 2 shows an illustrative diagram for generative adversarial networks for generating modified personal digital media items, in accordance with one or more embodiments.

FIG. 2 shows an illustrative system diagram for generative adversarial networks for generating modified personal digital media items in accordance with one or more embodiments. For example, the system may use a generative adversarial network to create modified images and/or modified features in those images. For example, FIG. 2 comprises the system 200. System 200 may be used to generate modified personal digital media items using generative adversarial networks. System 200, which may comprise a generative adversarial network, may include various objects. For example, system 200 may include random inputs 202 (e.g., random images) which are fed into generator 204 to generate samples 206 (e.g., a data source of random images of people). Similarly, real data 208 (e.g., personal digital media items) may generate samples 210 (a data source of personal digital media items). Samples 206 and samples 210 (e.g., modified may be fed into discriminator 212) outputs from discriminator 212 may include discriminator loss 216 and generator loss 214.

For example, in system 200 both the generator 204 and discriminator 212 may be neural networks. Generator 204 outputs may be connected directly to an input for discriminator 212. Through backpropagation, a classification from discriminator 212 provides a signal that generator 204 uses to update its weights. The backpropagation may comprise fine-tuning the weights in system 200 (and/or generator 204 or discriminator 212) based on the error rate obtained in the previous iteration. Proper tuning of the weights allows system 200 to reduce error rates.

For example, generator 204 may generate new data instances (e.g., modified images of the random samples). Discriminator 212 discriminates between different kinds of data instances. A generative adversarial network is a type of generative model. For example, given a set of data instances X and a set of labels Y, generator 204 may capture the joint probability p(X, Y), or just p(X) if there are no labels, whereas discriminator 212 captures the conditional probability p(Y|X).

Discriminator 212 may be a classifier that distinguishes real data (e.g., samples 210 or personal digital media items) from the data created by generator 204 (e.g., samples 206 or images created from the random input). For example, discriminator 212 may use samples 210 as positive examples during training. Discriminator 212 may use samples 210 as negative examples during training. In system 200, discriminator 212 connects to two loss functions (e.g., discriminator loss 216 and generator loss 214). During discriminator 212 training, discriminator 212 ignores generator loss 214 and uses discriminator loss 216.

During discriminator 212 training, discriminator 212 classifies both real data and fake data from generator 204. Discriminator loss 216 penalizes discriminator 212 for misclassifying a real instance (e.g., samples 210 or personal digital media items) as fake or a fake instance (e.g., samples 206 or images created from the random input) as real. Discriminator 212 updates its weights through backpropagation from discriminator loss 216 through the discriminator network. Generator 204 of system 200 learns to create fake data by incorporating feedback from discriminator 212 (e.g., it learns to make discriminator 212 classify its output as real). In some embodiments, generator 204 training requires tighter integration between generator 204 and discriminator 212 than discriminator training requires. For example, system 200 trains generator 204 using random inputs 202.

As generator 204 improves with training, discriminator 212 performance gets worse because discriminator 212 cannot easily tell a difference between samples 210 and samples 206. If generator 204 succeeds, then discriminator 212 may have a 50% accuracy. Accordingly, generator 204 attempts to maximize generator loss 214.

System 200 provides significant advantages over conventional machine learning. Specifically, system 200 may process image data. For example, system 200 may train on a subset of training categories (e.g., subsets within samples 206 and 210), wherein the subsets are linked to specific characteristics (e.g., features and/or content). For example, system 200 consists of generator 204 and discriminator 212 that compete in a two player minimax game for each subset of training categories. For example, for each subset, discriminator 212 tries to distinguish real training data for each subset (e.g., samples 210 or personal digital media items) from synthetic data for each subset (e.g., samples 206 or images created from the random input), and generator 204 tries to fool discriminator 212. For example, system 200 may include image encoders/decoders for each subset.

System 200 may be trained subset features encoded by a hybrid character-level convolutional recurrent neural network. Both the generator 204 and the discriminator 212 perform feed-forward inference conditioned on the subset feature. In system 200, discriminator 212 observes two kinds of inputs: real images, and synthetic images. System 200 implicitly separates two sources of error: unrealistic images and realistic images of the wrong class that mismatch the conditioning information. System 200 separates these error sources. By learning to optimize image matching in addition to the image realism, discriminator 212 provides an additional signal to the generator.

Figure 3:
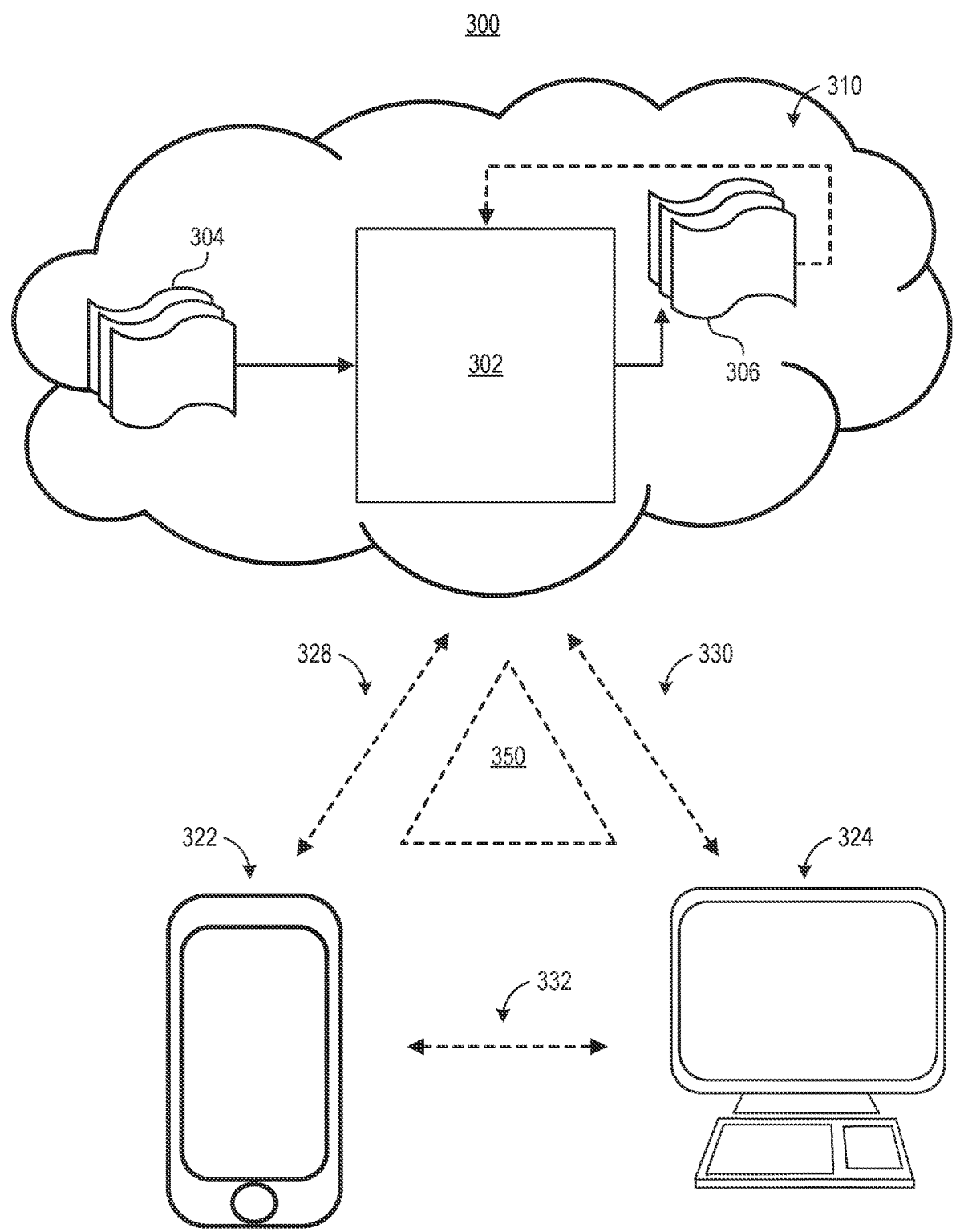
FIG. 3 shows illustrative components for a system used to authenticate users-based modifications to media items of the users to reduce malicious user authentication in accordance with one or more embodiments.

FIG. 3 shows illustrative components for a system used to authenticating users-based modifications to media items of the users to reduce malicious user authentication, in accordance with one or more embodiments. For example, FIG. 3 may show illustrative components for authenticating users with modified personal digital media items. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a user database, wherein the user database comprises a plurality of personal images of users and wherein each personal image of the plurality of personal images comprises one or more unmodified personal image features. Cloud components 310 may also include control circuitry configured to perform the various operations needed to authenticate the user. For example, the cloud components 310 may include cloud-based storage circuitry configured to authenticate a user based on user identification of one or more modifications to personal images. Cloud components 310 may also include cloud-based I/O circuitry configured to display the modified personal digital media item.

Cloud components 310 may include model 302, which may be a machine learning model, artificial intelligence model, etc. (which may be referred to collectively herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a prediction as to which feature within a set of images should be modified).

In a variety of embodiments, model 302 may update its configurations (e.g., weights, biases, or other parameters) based on the assessment of its prediction (e.g., outputs 306)

and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., classify if it is the selected feature or not).

In some embodiments, the model (e.g., model 302) may automatically perform actions based on outputs 306. In some embodiments, the model (e.g., model 302) may not perform any actions. The output of the model (e.g., model 302) may be used to determine which feature to modify.

System 300 also includes API layer 350. API layer 350 may allow the system to generate summaries across different devices. In some embodiments, API layer 350 may be implemented on mobile device 322 that may be a user device or user terminal 324. Alternatively, or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer, where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying Web Application Firewall (WAF) and Distributed Denial-of-Service (DDoS) protection, and API layer 350 may use RESTful APIs as standard for external integration.

FIG. 4 shows a flowchart of the steps involved in authenticating users-based modifications to media items of the users to reduce malicious user authentication, in accordance with one or more embodiments. For example, the system may use process 400 (e.g., as implemented on one or more system components described above) in order to prevent nefarious users from circumventing the authentication system.

At step 402, process 400 (e.g., using one or more components described above) may determine a respective similarity value for each of the personal images. For example, the system may determine, based on a plurality of personal digital media items of a user, a respective similarity value for each personal digital media item of the plurality of personal digital media items, wherein the respective similarity value indicates a similarity of a respective personal digital media item to the plurality of personal digital media items, and wherein each personal digital media item comprises one or more unmodified personal digital media item features. For example, the system may determine, based on a set of images of the user, a respective similarity value for unmodified features represented in the images. By doing so, the system may generate high-quality training data by determining what existing training data is similar enough to be repurposed for use in synthetic or modified training. For example, the respective similarity value may indicate that two personal images are substantially the same; therefore, modifying one feature within them may provide a high-quality modified image for use in authenticating a user.

In some embodiments, in determining the respective similarity value, the system may determine a percentage of the plurality of personal digital media items that comprises the one or more unmodified personal digital media item features. For example, the system may retrieve the plurality of personal digital media items. The system may determine a percentage of the plurality of personal digital media items that comprises the one or more unmodified personal digital media item features. The system may determine the respective similarity value based on the percentage. By doing so, the system may determine the respective similarity value to create a similarity value threshold. For example, the percentage of the plurality of personal digital media items that comprises the one or more unmodified personal digital media item features may indicate how similar one personal image is to the rest of the plurality, thereby creating a similarity value threshold that would need to be satisfied when selecting a personal image.

At step 404, process 400 (e.g., using one or more components described above) selects a personal image based on the personal image satisfying a similarity value threshold. For example, the system may select a personal digital media item from the plurality of personal digital media items, based on a respective similarity value for the personal digital media item satisfying a similarity value threshold. For example, the system may select one image out of the available set to modify. By doing so, the system may only select images that contain features that are common enough that once modified, the user will recognize it.

At step 406, process 400 (e.g., using one or more components described above) inputs the selected personal image into a generative adversarial network to generate a modified personal image. For example, the system may input the personal digital media item into a machine learning model to generate a modified personal digital media item, wherein the modified personal digital media item comprises one or more modified features corresponding to the one or more unmodified digital media item features of the personal digital media item. For example, the system may input the selected image into a generative adversarial network to generate a modified image. By doing so, the system may utilize an artificial intelligence application to generate the modified feature for the image for the user. For example, by inputting the selected image into the generative adversarial network, the generative adversarial network may be trained with the selected image to generate the modified personal digital media item.

In some embodiments, the machine learning model may comprise a generative adversarial network, wherein the generative adversarial network is trained to generate outputs of modified personal digital media items based on the respective similarity value by processing existing training data. By doing so, the system may utilize a generative adversarial network to generate the modified image for the user as a generative adversarial network may be trained to generate samples of images that are similar as opposed to other types of networks that would be trained to distinguish between samples of images.

At step 408, process 400 (e.g., using one or more components described above) generates in a user interface of a user device, the modified personal digital media item. For example, the system may generate, for presentation in a user interface of a user device, the modified personal digital media item. For example, the system may display the modified image on the user device. By doing so, the system may present the modified images to the user such that the user may select between the images when authenticating themselves.

In some embodiments, the system may generate a modified feature on an unmodified digital media item. For example, the system may generate the modified personal digital media item corresponding to the one or more unmodified digital media item features of the personal digital media item, further comprising: generating a mapping of the personal digital media item, determining a feature at a first region of the mapping, and generating the modified personal digital media item by replacing the feature with a modified feature at the first region. By doing so, the system may generate a modified feature so that the user may have a selection of images to choose from, wherein one or more images may include a modified feature.

At step 410, process 400 (e.g., using one or more components described above) receives via the user interface of the user device, one or more user selections of speculative modified features. For example, the system may receive via the user interface of the user device, one or more user selections of speculative modified features. For example, the system may receive the user selections on what is the modified feature. By doing so, the system may store the user's selections for the purpose of authenticating the selections. For example, the system may store the user's selections of the speculative modified features to the generated modified features to ensure that the user is properly authenticating themselves.

At step 412, process 400 (e.g., using one or more components described above) determines whether the one or more user selections of the speculative modified features correspond to the modified personal digital media item. For example, the system may determine whether the one or more user selections of the speculative modified features correspond to the one or more modified features of the modified personal digital media item. For example, the system may check whether the user correctly selected the modified feature in the modified image. By doing so, the system may ensure that authentication is accurate by determining whether the user selections of the speculative modified features corresponding to the modified personal digital media item.

In some embodiments, the system may determine whether the user selection corresponds to one or more modified features on the modified personal digital media item. For example, the system may determine whether the one or more user selections of the speculative modified features correspond to the one or more modified features of the modified personal digital media item comprising: generating a mapping of the modified personal digital media item, wherein the modified personal digital media item is located at a first region of the mapping. The system may detect a user input, and the system may determine whether the user input was detected at the first region. By doing so, the system may accurately authenticate the user by mapping the speculative modified features corresponding to the modified personal digital media item. For example, the system may map the speculative modified feature to the generated modified feature and determine if they match to ensure the user selected the correct features to ensure the user is authenticating themselves.

At step 414, process 400 (e.g., using one or more components described above) authenticates the user based on the one or more user selections of the speculative modified features. For example, the system may authenticate the user based on the one or more user selections of the speculative modified features corresponding to the one or more modified features of the modified personal digital media item. For example, the system may authenticate the user based on the accuracy of the user selection. By doing so, the system may reduce malicious user authentication by authenticating a user based on user identification of one or more modifications to personal images of a user.

In some embodiments, the system may determine a similarity threshold value. For example, the system may determine a security level corresponding to authenticating the user. The system may select the similarity value threshold from a plurality of similarity threshold values based on the security level. For example, the system may determine a similarity value threshold based on the security level. By doing so, the system may determine a similarity value threshold based on the security level for selecting an image to modify; therefore, the modified personal digital media item is limited in how different it can be from the original personal digital media item. For example, if the application the system is authenticating for has a lower security level, then the similarity threshold value will be lower to limit how different the generated image will be to the original.

In some embodiments, the system may determine a similarity threshold value. For example, the system may determine a frequency corresponding to authenticating the user. The system may select a threshold based on the frequency. For example, the system may determine a similarity value threshold based on the frequency of activity. By doing so, the system may determine a similarity value threshold based on the frequency metric for selecting an image to modify, thereby the modified personal digital media item is limited in how different it can be from the original personal digital media item. For example, if the user frequently uses the application they are authenticating for, then the similarity threshold value will be lower to limit how different the generated image will be to the original.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising determining a respective similarity value for each of the personal images; selecting a personal image based on the personal image satisfying a similarity value threshold; inputting the selected personal image into a generative adversarial network to generate a modified personal image; generating in a user interface of a user device, the modified personal digital media item; receiving via the user interface of the user device, one or more user selections of speculative modified features; determining whether the one or more user selections of the speculative modified features correspond to the modified personal digital media item; and authenticating the user based on the one or more user selections of the speculative modified features.

2. The method of any one of the preceding embodiments, determining, based on a plurality of personal digital media items of a user, a respective similarity value for each personal digital media item of the plurality of personal digital media items, wherein the respective similarity value indicates a similarity of a respective personal digital media item to the plurality of personal digital media items, and wherein each personal digital media item comprises one or more unmodified personal digital media item features; selecting a personal digital media item from the plurality of personal digital media items, based on a respective similarity value for the personal digital media item satisfying a similarity value threshold; inputting the personal digital media item into a machine learning model to generate a modified personal digital media item, wherein the modified personal digital media item comprises one or more modified features corresponding to the one or more unmodified digital media item features of the personal digital media item; generating, for presentation in a user interface of a user device, the modified personal digital media item; receiving, via the user interface of the user device, one or more user selections of speculative modified features; determining whether the one or more user selections of the speculative modified features correspond to the one or more modified features of the modified personal digital media item; and authenticating the user based on the one or more user selections of the speculative modified features corresponding to the one or more modified features of the modified personal digital media item.

3. The method of any one of the preceding embodiments, wherein determining the respective similarity value for each personal digital media item of the plurality of personal digital media items comprises: retrieving the plurality of personal digital media items; determining a percentage of the plurality of personal digital media items that comprises the one or more unmodified personal digital media item features; and determining the respective similarity value based on the percentage.

4. The method of any one of the preceding embodiments, further comprising: determining a security level corresponding to authenticating the user; and selecting the similarity value threshold from a plurality of similarity threshold values based on the security level.

5. The method of any one of the preceding embodiments, further comprising: determining a frequency corresponding to authenticating the user; and selecting a threshold based on the frequency.

6. The method of any one of the preceding embodiments, wherein the machine learning model comprises a generative adversarial network, wherein the generative adversarial network is trained to generate outputs of modified personal digital media items based on the respective similarity value by processing existing training data.

7. The method of any one of the preceding embodiments, wherein generating the modified personal digital media item corresponding to the one or more unmodified digital media item features of the personal digital media item further comprises: generating a mapping of the personal digital media item; determining a feature at a first region of the mapping; and generating the modified personal digital media item by replacing the feature with a modified feature at the first region.

8. The method of any one of the preceding embodiments, further comprising: determining a number of the one or more user selections; and determining whether the number of user selections is within a threshold limit of allowable user selections.

9. The method of any one of the preceding embodiments, further comprising: determining a security level corresponding to authenticating the user; and selecting the threshold limit of allowable user selections based on the security level.

10. The method of any one of the preceding embodiments, further comprising: determining a frequency corresponding to authenticating the user; and selecting the threshold limit of allowable user selections based on the frequency.

11. The method of any one of the preceding embodiments, wherein determining whether the one or more user selections of the speculative modified features correspond to the one or more modified features of the modified personal digital media item comprises: generating a mapping of the modified personal digital media item, wherein the modified personal digital media item is located at a first region of the mapping; detecting a user input; and determining whether the user input was detected at the first region.

12. A tangible, non-transitory, machine-readable medium storing instructions that, when executed by a data processing apparatus, cause the data processing apparatus to perform operations comprising those of any of embodiments 1-11.

13. A system comprising one or more processors and memory storing instructions that, when executed by the processors, cause the processors to effectuate operations comprising those of any of embodiments 1-11.

14. A system comprising means for performing any of embodiments 1-11.

What is claimed is:

1. A system for authenticating a user based on user identification of one or more modifications to personal images of a user to reduce malicious user authentication, the system comprising:
   cloud-based storage circuitry configured to store:
     a user database, wherein the user database comprises a plurality of personal images of users and wherein each personal image of the plurality of personal images comprises one or more unmodified personal image features; and
   cloud-based control circuitry configured to:
     determine, based on the plurality of personal images of the user, a respective similarity value for each of the personal images of the plurality of personal images, wherein the respective similarity value indicates a similarity of a respective personal image to the plurality of personal images to the user;
     select a personal image of the plurality of personal images based on the personal image satisfying a similarity value threshold;
     input a selected personal image into a generative adversarial network (GAN) to generate a modified personal image, wherein the modified personal image comprises one or more modified features corresponding to the one or more unmodified personal image features of the personal image;
     determine, based on the one or more modified features of the modified personal image, a modification value, wherein the modification value indicates a change of degree between the modified personal image and the personal image;
     generate, for display, in a user interface of a user device, the modified personal image in response to the modification value satisfying a modification threshold value;
     receive, via the user interface of the user device, one or more user selections of speculative modified features;
     determine whether the one or more user selections of the speculative modified features match the one or more modified features of the modified personal image;
     based on determining whether the one or more user selections of the speculative modified features match the one or more modified features of the modified personal image, determine a user selection correctness value, wherein the user selection correctness value indicates a correctness of the one or more user selections of the speculative modified features with respect to the one or more modified features of the modified personal image;
     authenticate the user in response to the user selection correctness value satisfying a user selection correctness threshold value;
     determine a security level corresponding to authenticating the user; and
     select the similarity value threshold from a plurality of similarity threshold values based on the security level.

2. A method for authenticating users based modifications to media items of a user to reduce malicious user authentication, the method comprising:
   determining, based on a plurality of personal digital media items of a user, a respective similarity value for each personal digital media item of the plurality of personal digital media items, wherein the respective similarity value indicates a similarity of a respective personal digital media item to the plurality of personal digital media items, and wherein each personal digital media item comprises one or more unmodified personal digital media item features;
   selecting, a personal digital media item from the plurality of personal digital media items, based on a respective similarity value for the personal digital media item satisfying a similarity value threshold;
   inputting the personal digital media item into a machine learning model to generate a modified personal digital media item, wherein the modified personal digital media item comprises one or more modified features corresponding to one or more unmodified digital media item features of the personal digital media item;
   generating, for presentation, in a user interface of a user device, the modified personal digital media item;
   receiving, via the user interface of the user device, one or more user selections of speculative modified features;
   determining whether the one or more user selections of the speculative modified features correspond to the one or more modified features of the modified personal digital media item;
   authenticating the user based on the one or more user selections of the speculative modified features corresponding to the one or more modified features of the modified personal digital media item;
   determining a security level corresponding to authenticating the user; and
   selecting the similarity value threshold from a plurality of similarity threshold values based on the security level.

3. The method of claim 2, wherein determining the respective similarity value for each personal digital media item of the plurality of personal digital media items comprises:
retrieving the plurality of personal digital media items;
determining a percentage of the plurality of personal digital media items that comprises the one or more unmodified personal digital media item features; and
determining the respective similarity value based on the percentage.

4. The method of claim 2, further comprising:
determining a frequency corresponding to authenticating the user; and
selecting a threshold based on the frequency.

5. The method of claim 2, wherein the machine learning model comprises a generative adversarial network, wherein the generative adversarial network is trained to generate outputs of modified personal digital media items based on the respective similarity value by processing existing training data.

6. The method of claim 2, wherein generating the modified personal digital media item, corresponding to the one or more unmodified digital media item features of the personal digital media item further comprises:
generating a mapping of the personal digital media item;
determining a feature at a first region of the mapping; and
generating the modified personal digital media item by replacing the feature with a modified feature at the first region.

7. The method of claim 2, further comprising:
determining a number of the one or more user selections; and
determining whether the number of the one or more user selections is within a threshold limit of allowable user selections.

8. The method of claim 7, further comprising:
selecting the threshold limit of allowable user selections based on the security level.

9. The method of claim 7, further comprising:
determining a frequency corresponding to authenticating the user; and
selecting the threshold limit of allowable user selections based on the frequency.

10. The method of claim 2, wherein determining, whether the one or more user selections of the speculative modified features correspond to the one or more modified features of the modified personal digital media item comprises:
generating a mapping of the modified personal digital media item, wherein the modified personal digital media item is located at a first region of the mapping;
detecting a user input; and
determining whether the user input was detected at the first region.

11. A non-transitory, computer readable medium for authenticating users based modifications to media items of a user to reduce malicious user authentication, comprising instructions that, when executed by one or more processors, cause operations comprising:
determining, based on a plurality of personal digital media items of a user, a respective similarity value for each personal digital media item of the plurality of personal digital media items, wherein the respective similarity value indicates a similarity of a respective personal digital media item to the plurality of personal digital media items, and wherein each personal digital media item comprises one or more unmodified personal digital media item features;
selecting, a personal digital media item from the plurality of personal digital media items, based on a respective similarity value for the personal digital media item satisfying a similarity value threshold;
inputting the personal digital media item into a machine learning model to generate a modified personal digital media item, wherein the modified personal digital media item comprises one or more modified features corresponding to one or more unmodified digital media item features of the personal digital media item;
generating, for presentation, in a user interface of a user device, the modified personal digital media item;
receiving, via the user interface of the user device, one or more user selections of speculative modified features;
determining whether the one or more user selections of the speculative modified features correspond to the one or more modified features of the modified personal digital media item;
authenticating the user based on the one or more user selections of the speculative modified features corresponding to the one or more modified features of the modified personal digital media item;
determining a security level corresponding to authenticating the user; and
selecting the similarity value threshold from a plurality of similarity threshold values based on the security level.

12. The non-transitory, computer readable medium of claim 11, wherein determining the respective similarity value for each personal digital media item of the plurality of personal digital media items comprises:
retrieving the plurality of personal digital media items;
determining a percentage of the plurality of personal digital media items that comprises the one or more unmodified personal digital media item features; and
determining the respective similarity value based on the percentage.

13. The non-transitory, computer readable medium of claim 11, further comprising:
determining a frequency corresponding to authenticating the user; and
selecting a threshold based on the frequency.

14. The non-transitory, computer readable medium of claim 11, wherein the machine learning model comprises a generative adversarial network, wherein the generative adversarial network is trained to generate outputs of modified personal digital media items based on the respective similarity value by processing existing training data.

15. The non-transitory, computer readable medium of claim 11, wherein generating the modified personal digital media item, corresponding to the one or more unmodified digital media item features of the personal digital media item further comprises:
generating a mapping of the personal digital media item;
determining a feature at a first region of the mapping; and
generating the modified personal digital media item by replacing the feature with a modified feature at the first region.

16. The non-transitory, computer readable medium of claim 11, further comprising:
determining a number of the one or more user selections; and
determining whether the number of the one or more user selections is within a threshold limit of allowable user selections.

17. The non-transitory, computer readable medium of claim 16, further comprising:

selecting the threshold limit of allowable user selections based on the security level.

18. The non-transitory, computer readable medium of claim 11, wherein determining, whether the one or more user selections of the speculative modified features correspond to the one or more modified features of the modified personal digital media item comprises:
  generating a mapping of the modified personal digital media item, wherein the modified personal digital media item is located at a first region of the mapping;
  detecting a user input; and
  determining whether the user input was detected at the first region.

* * * * *